United States Patent [19]
Wang et al.

[11] Patent Number: 6,133,354
[45] Date of Patent: *Oct. 17, 2000

[54] COPOLYMERS AS ADDITIVES IN THERMOPLASTIC ELASTOMER GELS

[75] Inventors: Xiaorong Wang; Victor J. Foltz, both of Akron; David F. Lawson, Uniontown, all of Ohio; Naruhiko Mashita, Yokohama, Japan

[73] Assignee: Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/193,595

[22] Filed: Nov. 17, 1998

[51] Int. Cl.[7] ........................................ C08J 5/54
[52] U.S. Cl. ...................... 524/268; 524/474; 524/476; 524/484; 524/505; 524/507; 524/516; 525/73; 525/93 C; 525/205
[58] Field of Search ........................ 525/73, 92 C, 525/205; 524/268, 474, 476, 484, 505, 507, 516

[56] References Cited

U.S. PATENT DOCUMENTS

| | | |
|---|---|---|
| 2,725,367 | 11/1955 | Niederhauser et al. . |
| 2,971,934 | 2/1961 | Brown et al. . |
| 3,244,664 | 4/1966 | Zelinski et al. . |
| 3,281,383 | 10/1966 | Zelinski et al. . |
| 3,297,654 | 1/1967 | Barr et al. . |
| 3,414,551 | 12/1968 | Reid et al. . |
| 3,428,596 | 2/1969 | Strand et al. . |
| 3,480,580 | 11/1969 | Joyner et al. . |
| 3,481,910 | 12/1969 | Brunson . |
| 3,492,227 | 1/1970 | Kolaian . |
| 3,528,936 | 9/1970 | Kent et al. . |
| 3,577,365 | 5/1971 | Folzenlogen et al. . |
| 3,594,452 | 7/1971 | De La Mare et al. . |
| 3,751,378 | 8/1973 | Cowperthwaite et al. . |
| 3,761,458 | 9/1973 | Holler et al. . |
| 3,796,687 | 3/1974 | Collette et al. . |
| 3,840,449 | 10/1974 | Furukawa et al. . |
| 3,862,265 | 1/1975 | Steinkamp et al. . |
| 3,970,608 | 7/1976 | Furukawa et al. . |
| 3,985,830 | 10/1976 | Fetters et al. . |
| 3,998,907 | 12/1976 | DiGiulio . |
| 4,015,612 | 4/1977 | Pavlik et al. . |
| 4,017,669 | 4/1977 | Collette et al. . |
| 4,087,485 | 5/1978 | Huff . |
| 4,104,332 | 8/1978 | Zelinski et al. . |
| 4,132,531 | 1/1979 | Cummings et al. . |
| 4,139,417 | 2/1979 | Marie et al. ............................ 252/51.5 |
| 4,151,336 | 4/1979 | Sackmann et al. ........................ 526/15 |
| 4,151,337 | 4/1979 | Kanoh et al. ............................ 526/116 |
| 4,287,314 | 9/1981 | Fava ........................................ 525/130 |
| 4,304,886 | 12/1981 | Bean, Jr. et al. ........................ 525/514 |
| 4,374,951 | 2/1983 | Lee et al. ................................. 525/73 |
| 4,404,321 | 9/1983 | Abolins et al. ........................... 525/68 |
| 4,404,322 | 9/1983 | Saito et al. ............................... 525/74 |
| 4,408,010 | 10/1983 | Le-Khac ................................. 525/73 |
| 4,423,196 | 12/1983 | Arlt et al. ................................ 526/72 |
| 4,427,828 | 1/1984 | Hergenrother et al. ................. 525/66 |
| 4,502,229 | 3/1985 | Kitzman ................................... 34/56 |
| 4,506,056 | 3/1985 | Gaylord ................................. 524/445 |
| 4,540,753 | 9/1985 | Cozewith et al. ....................... 526/88 |
| 4,585,824 | 4/1986 | Uchida et al. .......................... 524/494 |
| 4,605,700 | 8/1986 | Le-Khac ................................. 525/73 |
| 4,683,275 | 7/1987 | Kato et al. ............................. 526/262 |
| 4,728,463 | 3/1988 | Sutker et al. ........................... 525/609 |
| 4,732,928 | 3/1988 | Mizushiro et al. ..................... 524/505 |
| 4,735,992 | 4/1988 | Nogues et al. ........................... 525/64 |
| 4,771,097 | 9/1988 | Sackmann et al. ..................... 525/549 |
| 4,772,657 | 9/1988 | Akiyama et al. ....................... 524/504 |
| 4,889,896 | 12/1989 | Canova et al. . |
| 4,893,055 | 1/1990 | Fuzii et al. ............................. 313/479 |
| 4,912,144 | 3/1990 | McCready ............................. 523/522 |
| 4,921,910 | 5/1990 | Lunt et al. ............................... 525/74 |
| 4,931,502 | 6/1990 | McCready ............................... 525/64 |

(List continued on next page.)

FOREIGN PATENT DOCUMENTS

| | | |
|---|---|---|
| 47913/85 | 4/1986 | Australia . |
| B-47913/85 | 4/1986 | Australia . |
| 702610 | 1/1965 | Canada . |
| 0 177 401 A1 | 4/1986 | European Pat. Off. . |
| 0 322 905 A2 | 7/1989 | European Pat. Off. . |
| 0 408 470 A1 | 1/1991 | European Pat. Off. . |
| 0 440 922 A1 | 8/1991 | European Pat. Off. . |
| 0 536 753 A1 | 4/1993 | European Pat. Off. . |
| 0 728 767 A1 | 8/1996 | European Pat. Off. . |
| 42 25 875 A1 | 2/1994 | Germany . |
| 4241538 | 6/1994 | Germany . |
| 6-248017 | 6/1994 | Japan . |
| 922151 | 3/1963 | United Kingdom . |
| 952151 | 3/1964 | United Kingdom . |
| WO 96/23007 | 8/1996 | WIPO . |
| WO 97/00898 | 1/1997 | WIPO . |

OTHER PUBLICATIONS

L.E. Colleman, Jr., J.F. Bork, and H. Don, Jr.,. J. Org. Chem., 24, 1895 (1959).

A. Matsumoto, Y. Oki, and T. Otsu, Polymer J., 23,(3), 201 (1991).

CA 135; 87670q (1996) L. Haeussler, U. Wienhold, V. Albrecht, and S. Zschoche, Thermochim. Acta, 277, 14 (1986).

W. Kim, and K. Seo, Macromol. Rapid Communi., 17, 835 (1996).

W. Lee, and G.Hwong, J. Appl. Polym. sci., 59, 599 (1996).
I. Vermeesch and G. Groeninckx, J. Appl. Polym. Sci., 53, 1365 (1994).

Y. Kita, K. Kishino, and K. Nakagawa, J. Appl. Ploymer. Sci. 63, 1055 (1997).

*Primary Examiner*—Ana Woodward
*Attorney, Agent, or Firm*—David G. Burleson; Daniel N. Hall; Scott A. McCollister

[57] ABSTRACT

The present invention teaches a method for enabling the formation of a high damping composition. The method includes mixing a centipede polymer, i.e., a poly (disubstituted ethylene-co-maleimide) polymer, and plasticizers or extenders within a non-vulcanized thermoplastic elastomer to form a relatively high damping gel composition.

20 Claims, No Drawings

U.S. PATENT DOCUMENTS

| | | | |
|---|---|---|---|
| 4,996,262 | 2/1991 | Pyke et al. | 525/177 |
| 5,008,324 | 4/1991 | Killgoar, Jr. et al. | 524/504 |
| 5,034,449 | 7/1991 | Mallikarjun | 524/504 |
| 5,037,924 | 8/1991 | Tazi et al. | 526/272 |
| 5,082,913 | 1/1992 | Tazi et al. | 526/272 |
| 5,122,161 | 6/1992 | Benfaremo et al. | 44/348 |
| 5,126,403 | 6/1992 | Graiver et al. | 525/58 |
| 5,156,920 | 10/1992 | Aycock et al. | 428/517 |
| 5,202,384 | 4/1993 | Pyke et al. | 525/167 |
| 5,212,227 | 5/1993 | Sakazume et al. | 524/504 |
| 5,219,628 | 6/1993 | Hathaway et al. | 428/36.9 |
| 5,225,498 | 7/1993 | Sorathia et al. | 525/454 |
| 5,244,971 | 9/1993 | Jean-Marc | 525/64 |
| 5,318,854 | 6/1994 | Hamersma et al. | 428/483 |
| 5,356,953 | 10/1994 | Harada et al. | 523/171 |
| 5,373,048 | 12/1994 | Witzeman et al. | 524/458 |
| 5,414,044 | 5/1995 | Moriya et al. | 525/74 |
| 5,432,662 | 7/1995 | Kato et al. | 360/133 |
| 5,472,741 | 12/1995 | Sackmann et al. | 427/389 |
| 5,489,657 | 2/1996 | Sue et al. | 526/65 |
| 5,494,964 | 2/1996 | Meichsner et al. | 525/10 |
| 5,494,981 | 2/1996 | Gorodisher et al. | 525/504 |
| 5,532,317 | 7/1996 | Shinmura et al. | 525/73 |
| 5,536,774 | 7/1996 | Segatta | 524/505 |
| 5,548,031 | 8/1996 | Doi | 525/327.4 |
| 5,585,434 | 12/1996 | DeNicola, Jr. et al. | 525/67 |
| 5,585,436 | 12/1996 | Niessner et al. | 525/105 |
| 5,602,200 | 2/1997 | Wissmann | 525/66 |
| 5,618,881 | 4/1997 | Hojabr | 525/64 |
| 5,634,122 | 5/1997 | Loucks et al. | 395/608 |
| 5,637,410 | 6/1997 | Bonner et al. | 428/516 |
| 5,651,927 | 7/1997 | Auda et al. | 264/85 |
| 5,652,307 | 7/1997 | Niessner et al. | 525/101 |
| 5,654,364 | 8/1997 | Bates et al. | 525/98 |
| 5,658,985 | 8/1997 | Eichenauer et al. | 525/83 |
| 5,665,820 | 8/1997 | Kervagoret | 303/117.1 |
| 5,670,006 | 9/1997 | Wilfong et al. | 156/236 |
| 5,684,122 | 11/1997 | Inoue et al. | 528/363 |
| 5,691,411 | 11/1997 | Khouri et al. | 525/64 |
| 5,710,228 | 1/1998 | Krause et al. | 526/262 |
| 5,776,234 | 7/1998 | Schilling | 106/277 |
| 5,783,630 | 7/1998 | Evans et al. | 525/74 |
| 5,798,413 | 8/1998 | Spelthann et al. | 525/66 |
| 5,821,032 | 10/1998 | DoMinh . | |
| 5,869,695 | 2/1999 | Ulmer et al. | 525/545 |
| 5,883,188 | 3/1999 | Hwang et al. | 525/71 |
| 5,905,116 | 5/1999 | Wang et al. | 525/74 |
| 5,912,296 | 6/1999 | Wang et al. | 524/534 |
| 5,965,666 | 10/1999 | Koo et al. | 525/66 |

COPOLYMERS AS ADDITIVES IN THERMOPLASTIC ELASTOMER GELS

FIELD OF THE INVENTION

The present invention relates to the use of disubstituted-ethylene-alkylmalimide copolymers as additives to thermoplastic elastomers to form gels having improved damping properties.

BACKGROUND OF THE INVENTION

Poly(isobutylene-co-maleic anhydride) polymer is commercially available and is well known in the prior art. Furthermore, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A. Various other non-patent publications have also recognized these reactions. Included among them are: L. E. Colleman, Jr., J. F. Bork, and H. Donn, Jr., J. Org. Chem., 24, 185(1959); A. Matsumoto, Y. Oki, and T. Otsu, Polymer J., 23 (3), 201(1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polyn,!. Sci., 59, 599(1996); and, I. Vermeesch and G. Groeninckx, J. Appl. Polym. Sci., 53, 1356 (1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly (acrylonitrile-co-butadiene) and poly(styrene-co-acrylonitrile); PVC (poly(vinyl chloride)); SAN (poly (styrene-co-acrylo-nitrile)); PMMA (poly(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally arylonitrile and to blend these with ABS and SAN resins. In any event, the polymer compositions are ajusted so that the copolymers are fully compatible with the bulk resins (e.g., ABS and/or SAN) as shown by the presence of a single glass transition point ($T_g$) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree, of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to increase the tensile strength and tear strength in rubber compounds. It is particularly desirable to prepare a copolymer useful as an oil substitute that performs the function of a polymer extender or plasticizer while enhancing beneficial polymer properties such as tensile strength, maximum elongation, tear strength, and damping properties.

OBJECTS OF THE INVENTION

Accordingly, it is an object of this invention to provide a poly(disubstituted-ethylene-co-maleimide) that is useful as a plasticizer or an oil substitute to be used in the production of polymer gels.

Finally, it is yet another object of the invention is to produce a gel from a blend of a thermoplastic elastomer and a poly(disubstituted-ethylene-co-maleimide) copolymer that exhibits improved damping properties versus oil extended elastomers.

SUMMARY OF THE INVENTION

The present invention is directed to the use of poly (disubstituted-ethylene-co-maleimide) copolymers to extend or plasticize thermoplastic elastomers to form gels having improved damping properties.

DETAILED DESCRIPTION OF THE INVENTION

The gel compositions of the present invention contain a non-vulcanized thermoplastic elastomeric polymer; a poly ($R_1(R_2)$ethylene-co-maleimide) copolymer wherein $R_1$ and $R_2$ are the same or different substituents on the same α-carbon atom of the ethylene group selected from the group consisting of unsubstituted and substituted $C_1$ to $C_{20}$ alkyl groups, the substituted groups on the $C_1$ to $C_{20}$ alkyl groups being non-reactive with the remaining components of the centipede polymers such as alkoxyalkyl groups having $C_2$ to $C_{20}$ atoms and optionally, oils or other plasticizers. The poly($R_1(R_2)$ethylene-co-maleimide) copolymer and the additional oils or other plasticizers, if present, being used in amounts necessary to form a gel with the non-vulcanized thermoplastic elastomeric polymer. Suitable amounts of components to form a gel include: 100 parts by weight of a non-vulcanized thermoplastic elastomeric polymer; and 1 to 200 parts by weight of a poly($R_1(R_2)$ethylene-co-maleimide) copolymer, wherein $R_1$ and $R_2$ are defined above, and optionally, 1 to 10,000 parts by weight of oils or other plasticizers.

The poly($R_1(R_2)$ethylene-co-maleimide) is a "centipede" polymer formed by imidizing a poly($R_1(R_2)$ethylene-co-maleic anhydride) with a primary amine. The "centipede" polymer has a high molecular weight spine connected with many relatively short side chains formed from the addition of the primary amines. The length of the main chain usually is longer than the entanglement length, which is herein defined theoretically as an order of magnitude of 100 repeating units, while the length of the side chains is preferably smaller than or equal to the entanglement length.

The $R_1(R_2)$ethylene contributed monomer units of the poly($R_1$—$(R_2)$ethylene-co-maleimide) "centipede" polymer contain 4 to about 40 carbon atoms wherein $R_1$ and $R_2$ are the same or different substituents on the same α-carbon atom of the ethylene group selected from the group consisting of unsubstituted and substituted $C_1$ to $C_{20}$ alkyl groups, the substituted groups, such as alkoxyalkyl groups having $C_2$ to $C_{20}$ atoms, being non-reactive with the remaining components of the centipede polymers. Examples of unsubstituted and substituted alkyl groups $R_1$ and $R_2$ in the $R_1(R_2)$ ethylene contributed monomer units are methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonaclecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptoxynonyl, heptyloxydecyl, octyloxymethyl, octyloxethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and the like. In the preferred embodiment of the invention $R_1$ and $R_2$ are methyl groups and $R_1(R_2)$ ethylene is isobutylene. The poly($R_1(R_2)$ethylene-co-maleimide) of the present invention is formed by reacting a poly($R_1(R_2)$ethylene-co-(maleic anhydride)] at from about 100° C. to about 250° C. and from about slightly above vacuum to about 20 atmospheres, under substantially dry conditions in the presence of a primary amine. The present invention is preferably directed to a polymer compositions of a poly(isobutylene-co-maleimide) formed by reacting a poly(isobutylene-co-maleic anhydride) with a primary amine.

For the purposes of this invention, poly($R_1(R_2)$ethylene-co-maleimide) and poly($R_1$—$(R_2)$ethylene-co-maleic anhydride) are defined to encompass random and stereospecific copolymers, including copolymers having alternating $R_1(R_2)$ethylene and maleimide or maleic anhydride contributed monomer units along the polymer backbone. Such alternating structure are typically described as poly($R_1$($R_2$)ethylene-alt-maleimide) and poly($R_1(R_2)$ethylene-alt-maleic anhydride); however, these polymers are encompassed herein within the descriptions poly($R_1(R_2)$ethylene-co-maleimide) and poly($R_1(R_2)$ethylene-co-maleic anhydride).

Processes for forming poly($R_1(R_2)$ethylene-co-maleic anhydride) polymers are well known to those skilled in the art. The preparation of the copolymers from electron donor monomers, such as disubstituted ethylene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N.G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry Edition), A4, 127 (1970).

Poly($R_1(R_2)$ethylene-co-maleic anhydride) polymers are prepared by reacting monomers of $R_1(R_2)$ethylene with maleic anhydride. The preferred $R_1(R_2)$ethylene monomer used for forming the poly($R_1(R_2)$ethylene-co-maleic anhydride) polymer is isobutylene.

The poly($R_1(R_2)$ethylene-co-maleic anhydride) for use in the present invention is a polymer containing from about 5 to 99 mole percent of maleic anhydride (and subsequent maleimide) monomer contributed units with the remaining 1 to 95 mole percent being $R_1(R_2)$ethylene monomer contributed units. The preferred poly($R_1(R_2)$ethylene-co-maleic anhydride) contains from 20 to 50 mole percent of maleic anhydride monomer (and subsequent maleimide) contributed units and 80 to 50 mole percent of $R_1(R_2)$ethylene monomer contributed units. The most preferred poly($R_1(R_2)$ethylene-co-maleic anhydride) for use in the present invention is poly(isobutylene-co-maleic anhydride) containing 50 mole percent of maleic anhydride monomer contributed units and 50 mole percent of isobutylene monomer contributed units. The comonomers, maleic anhydride and $R_1(R_2)$ethylene, can be randomly or alternatingly distributed in the chain, however, it is preferred to have these comonomers alternating along the polymer backbone chain. The poly($R_1$($R_2$)ethylene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly($R_1(R_2)$ethylene-co-maleimide) of the present invention is formed by reacting a poly($R_1(R_2)$ethylene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the reactor containing a charge of poly($R_1(R_2)$ethylene-co-maleic anhydride). Preferably the primary amine is charged in ratio between 0.8 to 1.0 of moles of amine per monomer contributed units of maleic anhydride in the poly($R_1(R_2)$ethylene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dcdecylamine and the like.

The poly($R_1(R_2)$ethylene-co-maleimide), preferably has a molecular weight range between about 1,000 and up to about 500,000 or higher, more typically between about 10,000 and 500,000, and even more typically between about 150,000 and 450,000, where the molecular weight is weight-average ("$M_w$"). The poly($R_1(R_2)$ethylene-co-maleimide) polymers of the present invention may be prepared by any means well known in the art for combining such ingredients, such as blending, milling or internal batch mixing. A rapid and convenient method of preparation comprises heating a mixture of the components to a temperature of about 50° C. to about 290° C. The poly($R_1(R_2)$ethylene-co-maleimide) polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or argon, is also preferable.

In accordance with the present invention, the poly($R_1(R_2)$ethylene-co-maleimide) copolymer composition of the present invention may be added as an additive or as a plasticizer to a non-vulcanized, thermoplastic elastomeric polymer in an amount ranging from about 1 to 200 parts by weight of poly($R_1(R_2)$ethylene-co-maleimide) copolymer plasticizer per 100 parts by weight of the thermoplastic elastomeric polymer; preferably in an amount ranging from about 5 to 150 parts by weight of poly($R_1(R_2)$ethylene-co-maleimide) copolymer per 100 parts by weight of the thermoplastic elastomeric polymer, most preferably from about 10 to 100 parts of poly($R_1(R_2)$ethylene-co-maleimide) copolymer per 100 parts of the thermoplastic elastomeric polymer. These parts by weight being effective plasticizing amounts of poly($R_1(R_2)$ethylene-co-maleimide) copolymer in elastomers to form gels.

Typical, but by no means limited to the types of non-vulcanized thermoplastic elastomeric polymers that may be compatibly blended and extended by the poly($R_1(R_2)$ethylene-co-maleimide) copolymers of the present invention are thermoplastic elastomeric polymers including but not limited to all non-vulcanized thermoplastic natural and synthetic polymers and mixtures thereof including: hydrogenated block copolymers including but are not limited to: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene, block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene-ethylene block copolymer (hydrogenated BR-SBR-BR block copolymer), ethylene-ethylene/butylene-ethylene block copolymer (EEBE) and the like and mixtures thereof. The preferred hydrogenated block copolymer for use in the present invention is styrene-ethylene/butylene-styrene block copolymer (SEBS).

The hydrogenated block copolymers of the above structures used in the present invention have a number average molecular weight in a range of from 5,000 to 1,000,000, preferably from 50,000 to 800,000, more preferably 70,000 to 500,000, and the molecular weight distribution ratio (Mw/Mn) of weight average molecular weight (Mw) to number average molecular weight (Mn) is 10 or less. The molecular structure type of the hydrogenated block copolymer may be any of straight-chain, branched involving partial coupling with a coupling agent, radial and the star-shaped types and combinations thereof.

There is no limitation to a method for producing these hydrogenated block copolymers, so far as they have the structure described above. These copolymers can be obtained by synthesizing a vinyl-substituted aromatic hydrocarbon/conjugated diene block copolymer in an inert solvent using an organo-lithium and, if necessary, a 1,2-vinyl bond modifier such as ether compounds, tertiary amines, etc. according to the methods, for example, disclosed in British Patent No. 1,130,770 and U.S. Pat. Nos. 3,281,383 and 3,639,517, and then hydrogenating the resulting block copolymer according to the well-known methods, for example, disclosed in British Patent No. 1,020,720 and U.S. Pat. Nos. 3,333,024 and 4,501,857. In this case, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer.

Other natural and synthetic polymers for use in the present invention include: natural rubber, polyisoprene, both cis and trans polybutadiene, butadiene/styrene rubber (SBR), butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, for example, copolymers of isoprene and butadiene, butadiene and piperylene, and the like and blends thereof. SBR and polybutadiene are preferred elastomers.

The synthetic or rubber elastomers of the present invention are polymers or copolymers made from monomers or comonomers, generally considered by those skilled in the art, capable of forming rubber elastomers. More specifically, the monomers are selected from the group of compounds consisting of conjugated dienes having from 4 to about 10 carbon atoms, comonomers of various dienes having from 4 to 10 carbon atoms so that copolymers are formed and monomers of dienes having from 4 to 10 carbon atoms with olefins having from 2 to 14 carbon atoms. A preferred group of olefin compounds are the vinyl substituted aromatic hydrocarbons containing from 8 to 12 carbon atoms and includes styrene, α-methylstyrene, ortho-, para-, and meta-methyl and ethyl styrene and the like. Specific examples of olefins include methene, propene, butene, pentene, hexene, heptene, octene, nonene, decene, dodecene and the like. Concerning the diene compounds, the dienes having from 4 to 6 carbon atoms are preferred.

The synthetic elastomers are prepared according to conventional or common methods or processes well known to those skilled in the art. Generally, an emulsion process may be utilized or a free radical process wherein the elastomer monomer is soluble in a solvent. Of course, the elastomers may additionally be prepared utilizing an anionic polymerization with various commonly employed catalysts such as organolithium compounds.

The use of poly($R_1(R_2)$ethylene-co-maleimide) copolymers produced according to the present invention as plasticizers for elastomeric polymers either alone or as a partial oil substitute increases the damping properties of the elastomeric polymers over comparable oil extended polymers. The polymer gels produced according to the present invention generally have high damping properties having a tan δ in the range of about 0.1 to about 1.0, preferably higher than 0.3 over the temperature range of 30° C. to 100° C. and a Shore A hardness ranging from 0 to about 50, preferably about 0 to about 30, most preferably about 5 to 20 at about 20° C. to 25° C. or at room temperature. The service temperature of the gels of the present invention is less than or equal to 100° C.

Although the present invention also contemplates use of the present poly($R_1(R_2)$ethylene-co-maleimide) copolymers in combination with conventional extender oils as additives to elastomers, an embodiment contemplates the total or partial substitution of conventional extenders by poly($R_1(R_2)$ethylene-co-maleimide) copolymers. Typical prior art extenders replaced by the present poly($R_1(R_2)$ethylene-co-maleimide) copolymers include extender oils and low molecular weight compounds or components. Such extender oils include those well known in the art such as naphthenic, aromatic and paraffinic petroleum oils and silicone oils. Examples of low molecular weight organic compounds or components extenders in the compositions that may be replaced by the graft copolymers of the present invention are low molecular weight organic materials having a number-average molecular weight of less than 20,000, preferable less than 10,000, and most preferably less than 5,000.

In accordance with the present invention, the poly($R_1(R_2)$ethylene-co-maleimide) polymer compositions of the present invention may optionally have added thereto from about 1 to 1,000 parts by weight of extender, particularly oil or other plasticizer, per 100 parts by weight of the poly($R_1(R_2)$ethylene-co-maleimide) copolymers. Most preferred amounts of added extender include from about 1 to about 500 parts of oil per 100 parts of poly($R_1(R_2)$ethylene-co-maleimide) copolymer and ideally about 10 to about 100 parts of extender per 100 parts of poly($R_1(R_2)$ethylene-co-maleimide) copolymer.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the ringe of 1 to 350 parts of additives or compounding ingredients per 100 parts of the combined poly($R_1(R_2)$ethylene-co-maleimide) copolymer and elastomeric polymer.

A reinforcing agent may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystrene block copolymers such as Hybler (produced by Kurare Inc.), polynorbornenes such as Norsorex (produced by Nippon Zeon Inc.) and the like. In this case the foregoing materials are equally applicable to the centipede polymer containing gel compositions.

The gel compositions of the present invention may be prepared by any means well known in the art for combining such ingredients, such as solution blending, milling, internal batch mixing, or continuous extrusion of the poly($R_1(R_2)$ethylene-co-maleimide) copolymer and thermoplastic elastomeric polymers or copolymers and the other ingredients. A rapid and convenient method of preparation comprises heating a mixture of the components to a temperature of about 50° C. to about 290° C.

The blended gel compositions of the present invention can be mixed in any conventional mixer such as a Banbury mixer or roll mill or extruder normally conducted within the temperature range of about 120° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when subsequently forming the any molded articles from the gel composition.

In summary, the gels and the subsequent molded polymers produced from the blend of an elastomer and poly($R_1(R_2)$ethylene-co-maleimide) copolymer compositions of the present invention retain elastomeric characteristics and are useful in high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan δ. A forced oscillation is applied to a material at frequency f and the transmitted force and phase shift are measured. The phase shift angle delta is recorded. The value of tan δ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 hz) over a temperature range. We have defined an unfilled material as useful for damping when tan δ<~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, medical instruments and tire rubber formulations.

Representative examples of the use of molded components formed from the gel compositions of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Furthermore these materials are suitable for use in racing tire formulations.

In the following, the present invention will be described in more detail with reference to non-limitative examples. The following examples and tables are presented for purposes of illustration only and are not to be construed in a limiting sense.

Preparation of Centipede Polymer

EXAMPLE 1

A nitrogen purged Brabender mixer (~310 gram capacity) equipped with Banbury blades was initially set to 10 rpm and the temperature was set to 30° C. The mixer was then charged with 100 g of poly(isobutylene-alt-maleic anhydride) (IM-10 obtained from Kuraray Co. Ltd., Tokyo, Japan; $M_n$ of 350,00) and 118.8 g of dodecyl amine (obtained from Aldrich Chemical Company of 1001 West Saint Paul Avenue, Milwaukee, Wis., 95% purity). After 10 minutes of continuous mixing, the mixture was allowed to heat up at a rate of 10° C./min. Once the temperature reached 125° C., agitation was discontinued When the stock temperature reached 210° C., the heating element was set at isothermal conditions and agitation speed was slowly increased from 0 to 90 rpm at a rate of 10 rpm/min. Once the agitation speed reached 90 rpm, the temperature was re-set to 190 ° C. The mixing was continued isothermally for an additional 90 minutes, then the heating element of the mixer was turned off, and the polymer mass within the mixer was permitted to cool down to 160° C. at a rate of ~4° C./min. The agitation was then stopped and the polymer product mass was then removed from the mixer. Properties of the recovered polymer including mean molecular weight ($M_n$), polydispersity [number average molecular weight ($M_w$)/mean molecular weight ($M_n$)], and intrinsic viscosity ($\eta_0$) at 20° C. in tetrahydrofuran (THF) are displayed in Table 1.

EXAMPLE 2

The procedure of Example 1 was followed except that the mixer was charged with 65 g of poly(isobutylene-alt-maleic anhydride) (IM-10) and 100 g of hexadecyl amine (obtained from Aldrich Chemical Company, 99% purity). Properties of the recovered polymer are displayed in Table 1.

EXAMPLE 3

The procedure of Example 1 was followed except that the mixer was charge with 90 g of poly(isobutylene-alt-maleic anhydride) (IM-10) and 155.4 g of octadecyl amine (obtained from Aldrich Chemical Company, 98% purity). Properties of the recovered polymer are displayed in Table 1.

IR absorption peak characteristics of the polymer masses recovered in Examples 1 to 3 were noted substantially at 1701 $cm^{-1}$, 1770 $cm^{-1}$, 2855 $cm^{-1}$ and 2926 $cm^{-1}$. No trace of maleic anhydride absorption peaks or amino-group peaks were detected for these polymers. Molecular weight was determined by a GPC method using polystyrene as a standard.

TABLE 1

| Example No. | 1 | 2 | 3 |
|---|---|---|---|
| Molecular weight ($M_n$) | 116,000 | 110,000 | 116,000 |
| Polydispersibility ($M_w/M_n$) | 1.76 | 1.98 | 2.32 |
| Intrinsic Viscosity in THF, 20° C. | 0.75 | 0.68 | 0.74 |

EXAMPLE 4

Gel Compounding

A nitrogen purged Brabender mixer (~55 gram capacity) equipped with a roller blade was initially set to 30 rpm and the temperature was set to 160° C. The mixer was then charged with 25 g of commercial SEBS (Septon 4077 obtained from Kuraray Co. Ltd., Tokyo, Japan) and 12.5 g of paraffinic oil (PW380). After 10 minutes of continuous mixing, an additional charge of 12.5 g of paraffinic oil was added to the mixer and the agitation speed was increased to 60 rpm. The mixing was continued for another 20 minutes, the agitation was discontinued and the mixture was removed from the mixer.

EXAMPLE 5

A nitrogen purged Brabender mixer (~55 gram capacity) equipped with a roller blade was initially set to 30 rpm and the temperature was set to 160° C. The mixer was then charged with 15 g of commercial SEBS (Septon 4077 obtained from Kuraray Co. Ltd., Tokyo, Japan), 10.0 g of the product from Example 1, and 12.5 g of paraffinic oil (PW380). After 10 minutes of continuous mixing, an additional charge of 12.5 g of paraffinic oil was added to the mixer and the agitation speed was increased to 60 rpm. The mixing was continued for another 20 minutes, the agitation was discontinued and the resultant gel mixture was removed from the mixer.

EXAMPLE 6

A nitrogen purged Brabender mixer (~55 gram capacity) equipped with a roller blade was initially set to 30 rpm and the temperature was set to 160° C. The mixer was then charged with 15 g of commercial SEBS (Septon 4077 obtained from Kuraray Co. Ltd., Tokyo, Japan), 10.0 g of the product from Example 2, and 12.5 g of paraffinic oil (PW380). After 10 minutes of continuous mixing, an additional charge of 12.5 g of paraffinic oil was added to the mixer and the agitation speed was increased to 60 rpm. The mixing was continued for another 20 minutes, the agitation was discontinued and the resultant gel was removed from the mixer.

EXAMPLE 7

A nitrogen purged Brabender mixer (~55 gram capacity) equipped with a roller blade was initially set to 30 rpm and the temperature was set to 160° C. The mixer was then charged with 15 g of commercial SEBS (Septon 4077 obtained from Kuraray Co. Ltd., Tokyo, Japan), 10.0 g of the product from Example 3, and 12.5 g of paraffinic oil (PW380). After 10 minutes of continuous mixing, an additional charge of 12.5 g of paraffinic oil was added to the mixer and the agitation speed was increased to 60 rpm. The mixing was continued for another 20 minutes, the agitation was discontinued and the resultant gel was removed from the mixer.

For each of the compounds of Examples 4 to 7, measurements of the Shore A, compression set at 70° C., tensile strength/elongation at break and, hysteresis loss were taken. The results of these measurements appear in Table 2. Measurements of tensile strength were based upon the conditions of ASTM-D 412 at 22° C. Test specimen geometry was taken in the form of a ring having a width of 0.05 inches and a thickness of 0.075 inches. The specimen was tested at a specific gauge length of 1.0 inches. The hysteresis loss (Tan δ) was measured with a Dynamic Analyzer at 1 Hz.

According to the results displayed in Table 3, it was concluded that the gels formed from centipede polymer and elastomeric polymer blend developed according to the present invention (as shown in Examples 1 to 3) are suitable as high damping materials.

TABLE 3

| Example No. | Polymers Used | Shore A | Compression Set[1] at 70° C. (%) | Tb/Eb[2] (PSI/%) | Tan δ at 10° C. | Tan δ at 20° C. | Tan δ at 40° C. |
|---|---|---|---|---|---|---|---|
| 4 (comp.) | SEBS | 15 | 28.5 | 500/832 | 0.070 | 0.059 | 0.061 |
| 5 | SEBS/ Example 1 | 16 | 46.4 | 89/242 | 0.19 | 0.19 | 0.22 |
| 6 | SEBS/ Example 2 | 15 | 53.4 | 101/539 | 0.25 | 0.27 | 0.20 |
| 7 | SEBS/ Example 3 | 10 | 53.0 | 95/634 | 0.37 | 0.54 | 0.31 |

[1]The Compression Set was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 70° C. for 22 hours. The sample is removed from the oven, the stress on the sample is relieved, the sample is stored at room temperature for 30 minutes and the recovery of the sample is measured as the final sample height as X in: Compression Set ((0.5 − X)/(0.5−0.375)) × 100%.
[2]Tensile strength/Elongation at break While certain representative embodiments and details have been shown for the purpose of illustrating the invention, it will be apparent to those skilled in this art that various changes and modifications may be made therein without departing from the scope of the invention.

We claim:

1. A method for the formation of a high damping gel, comprising: mixing in any order a non-vulcanized thermoplastic elastomeric polymer or copolymer with a poly($R_1$ ($R_2$)ethylene-co-maleimide) copolymer wherein $R_1$ and $R_2$ are the same or different substituents selected from the group consisting of $C_1$ to $C_{20}$ alkyl groups and wherein the maleimide portion of the polymer is the reaction product of maleic anhydride and a primary amine selected from the group consisting of alkyl amines, alkyl benzyl amines, alkyl phenyl amines, alkoxybenzyl amines, alkyl aminobenzoates, and alkoxy aniline wherein the alkyl and alkoxy substituents of the primary amines contain from 1 to 50 carbon atoms; and an extender in proportions sufficient to form a gel.

2. The method of claim 1, wherein the poly($R_1$($R_2$) ethylene-co-maleimide) comprises from about 5 to 99 mole percent of maleimide monomer contributed units and 1 to 95 mole percent of $R_1$($R_2$)ethylene monomer contributed units.

3. The method of claim 1, wherein the poly($R_1$($R_2$) ethylene-co-maleimide) comprises from about 20 to 50 mole percent of maleimide contributed units and 80 to 50 mole percent of $R_1$($R_2$)ethylene monomer contributed units.

4. The method of claim 1, wherein $R_1$ and $R_2$ are independently selected from the group consisting of: methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and mixtures thereof.

5. The method of claim 1 wherein the maleimide contributed monomer units of the poly($R_1(R_2)$ethylene-co-maleimide) is formed by the reaction of maleic anhydride and a primary amine.

6. The method of claim 1 wherein the non-vulcanized thermoplastic elastomeric polymer or copolymer is selected from the group consisting of: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene-ethylene block copolymer (hydrogenated BR-SBR-BR block copolymer), ethylene-ethylene/butylene-ethylene block copolymer (EEBE) and mixtures thereof, natural rubber, polyisoprene, polybutadiene, butadiene/styrene rubber (SBR), ethylene/propylene copolymer rubbers, butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, and blends thereof.

7. The method of claim 1, wherein the poly($R_1(R_2)$ethylene-co-maleimide) is poly(isobutylene-co-maleimide).

8. The method of claim 1 wherein the high damping copolymer blend comprises: 0.5 to 200 parts by weight the poly($R_1(R_2)$ethylene-co-maleimide) copolymer per 100 parts by weight of the elastomeric polymer.

9. The method of claim 1 wherein the high damping copolymer blend comprises: a ratio by weight of the poly($R_1(R_2)$ethylene-co-maleimide) to the extender ranging between 100:1 to 1:100.

10. A thermoplastic elastomer gel composition comprising:
a blend comprised of, (i) a non-vulcanized thermoplastic elastomeric polymer or copolymer, (ii) a poly($R_1(R_2)$ethylene-co-maleimide) copolymer wherein $R_1$ and $R_2$ are the same or different substituents selected from the group consisting of $C_1$ to $C_{20}$ alkyl groups and wherein the maleimide portion of the polymer is the reaction product of maleic anhydride and a primary amine selected from the group consisting of alkyl amines, alkyl benzyl amines, alkyl phenyl amines, alkoxybenzyl amines, alkyl aminobenzoates, and alkoxy aniline wherein the alkyl and alkoxy substituents of the primary amines contain from 1 to 50 carbon atoms and, (iii) an extender in proportions sufficient to form a gel.

11. The thermoplastic elastomer gel composition of claim 10, wherein the poly($R_1(R_2)$ethylene-co-maleimide) comprises from about 5 to 99 mole percent of maleimide monomer contributed units and 1 to 95 mole percent of $R_1(R_2)$ethylene monomer contributed units.

12. The thermoplastic elastomer gel composition of claim 10, wherein the poly($R_1(R_2)$ethylene-co-maleimide) comprises from about 20 to 50 mole percent of maleimide contributed units and 80 to 50 mole percent of $R_1(R_2)$ ethylene monomer contributed units.

13. The thermoplastic elastomer gel composition of claim 10, wherein $R_1$ and $R_2$ are independently selected from the group consisting of: methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxdecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl 3-methylhexyl, 2,5-dimethylhexyl and mixtures thereof.

14. The thermoplastic elastomer gel composition of claim 10, wherein the maleimide contributed monomer units of the poly($R_1(R_2)$ethylene-co-maleimide) is formed by the reaction of maleic anhydride and a primary amine.

15. The thermoplastic elastomer gel composition of claim 10 wherein the elastomeric polymer or copolymer is selected from the group consisting of: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene-ethylene block copolymer (hydrogenated BR-SBR-BR block copolymer), ethylene-ethylene/buttylene-ethylene block copolymer (EEBE) and mixtures thereof.

16. The thermoplastic elastomer gel composition of claim 10, wherein the poly($R_1(R_2)$ethylene-co-maleimide) is poly(isobutylene-alt-maleimide).

17. The thermoplastic elastomer gel composition of claim 10, wherein the high damping copolymer blend comprises: 1 to 200 parts by weight the poly($R_1$($R_2$)ethylene-co-maleimide) copolymer per 100 parts by weight of the elastomeric polymer or copolymer.

18. The thermoplastic elastomer gel composition of claim 10, further comprising from 1 to 350 parts of a inorganic filler, additive or compounding ingredient based on 100 parts by weight of the combined poly($R_1$($R_2$)ethylene-co-maleimide) copolymer and the elastomeric polymer components.

19. The thermoplastic elastomer gel composition of claim 10, further comprising an extender selected from the group consisting of: softening agents, plasticizers, tackifiers, oligomers, lubricants, petroleum hydrocarbons, silicone oil, aromatic oil, naphthenic oil and paraffinic oil.

20. The thermoplastic elastomer gel composition of claim 11 wherein the thermoplastic elastomer gel composition comprises: a ratio by weight of the poly($R_1$($R_2$)ethylene-co-maleimide) to the extender ranging between 100:1 to 1:100.

* * * * *